(12) United States Patent
Hong et al.

(10) Patent No.: US 9,160,648 B2
(45) Date of Patent: Oct. 13, 2015

(54) CONTENT-CENTRIC NETWORK AND METHOD OF PERFORMING ROUTING BETWEEN DOMAINS THEREFOR

(75) Inventors: Seong Ik Hong, Suwon-si (KR); Jae Hoon Kim, Seoul (KR); Byoung-Joon Lee, Seongnam-si (KR); Ji Hoon Lee, Anyang-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 13/527,963

(22) Filed: Jun. 20, 2012

(65) Prior Publication Data
US 2013/0177024 A1 Jul. 11, 2013

(30) Foreign Application Priority Data
Jan. 5, 2012 (KR) .......................... 10-2012-0001520

(51) Int. Cl.
| | |
|---|---|
| *H04L 12/56* | (2006.01) |
| *H04L 12/751* | (2013.01) |
| *H04L 12/715* | (2013.01) |
| *H04L 12/64* | (2006.01) |
| *H04L 12/28* | (2006.01) |

(52) U.S. Cl.
CPC ............ *H04L 45/02* (2013.01); *H04L 12/6418* (2013.01); *H04L 45/04* (2013.01); *H04L 45/64* (2013.01)

(58) Field of Classification Search
CPC ... H04L 45/00; H04L 12/243; H04L 12/5689; H04L 29/08972; H04L 41/12; H04L 45/021; H04L 45/04; H04L 67/327; H04L 2012/6443

USPC ............... 370/410, 392, 400, 225, 389, 331; 726/22, 3
See application file for complete search history.

(56) References Cited

U.S. PATENT DOCUMENTS

| | | | |
|---|---|---|---|
| 8,264,949 B2* | 9/2012 | Ravindran et al. ............ 370/217 |
| 2003/0099237 A1 | 5/2003 | Mitra et al. |
| 2009/0288163 A1 | 11/2009 | Jacobson et al. |

(Continued)

FOREIGN PATENT DOCUMENTS

EP 2159994 A1 3/2010

OTHER PUBLICATIONS

European Search Report issued Apr. 19, 2013 in Counterpart Eurpoean Patent Application No. 13150238.7-1505.

(Continued)

*Primary Examiner* — Charles C Jiang
*Assistant Examiner* — Will Lin
(74) *Attorney, Agent, or Firm* — NSIP Law (57) ABSTRACT

A Content-Centric Network and a method of performing routing between domains therefore are provided. The method includes identifying a route from an anchor hub in a first domain to one or more hubs in the first domain, the anchor hub being configured to store routing information between a first border hub of the hubs in the first domain and a second border hub in a second domain, detecting, by each of the hubs in the first domain, a neighboring hub based on a sync direction corresponding to the identified route, and sharing the routing information with the neighboring hub, the sharing of the routing information including performing a sync operation between the neighboring hub and each of the hubs in the first domain.

28 Claims, 6 Drawing Sheets

(56) References Cited

U.S. PATENT DOCUMENTS

2010/0195655 A1    8/2010   Jacobson et al.
2010/0208744 A1    8/2010   Shaikh et al.
2011/0026437 A1    2/2011   Roja-Cessa et al.
2012/0204224 A1*   8/2012   Wang et al. ........................ 726/3
2012/0317307 A1*   12/2012  Ravindran et al. ............ 709/238

OTHER PUBLICATIONS

Choi, Jaeyoung, et al. "A Survey on Content-Oriented Networking for Efficient Content Delivery" Communications Magazine, IEEE 49.3 (Mar. 2011) pp. 121-127.

* cited by examiner

CONTENT-CENTRIC NETWORK AND METHOD OF PERFORMING ROUTING BETWEEN DOMAINS THEREFOR

CROSS-REFERENCE TO RELATED APPLICATIONS

This application claims the benefit under 35 U.S.C. §119(a) of Korean Patent Application No. 10-2012-0001520, filed on Jan. 5, 2012, in the Korean Intellectual Property Office, the entire disclosure of which is incorporated herein by reference for all purposes.

BACKGROUND

1. Field

The following description relates to a Content-Centric Network and a method of performing routing between domains therefor.

2. Description of Related Art

In a Content-Centric Network (CCN), packets are classified into content request packets and content transfer packets. A content request packet contains a name of content that is requested. A content transfer packet contains the requested content, a name of the requested content, and the like.

For example, when a content request packet is received by networking equipment, the networking equipment may use the name of the content that is requested in a header to search storage of the networking equipment for the content that is requested by the content request packet. In this example, when the requested content is found, the networking equipment may transfer the requested content to a requester. Accordingly, in the CCN, a predetermined node in a route to an original owner of the requested content may provide the requested content when the requested content is stored in storage of the predetermined node. On the other hand, an Internet Protocol (IP)-based Internet requires requested content to be received directly from the original owner of the requested content. Since an average length of a transmission route is reduced, overall usage of a network may be reduced.

The CCN may search for neighboring content through flooding of a content request packet, namely an interest. The flooding is a representative scheme of damaging scalability. Accordingly, there is a desire for a routing method that may set a small-scale community or an area that includes a predetermined number of routers or terminals (e.g., several tens to hundreds of routers or terminals) to be a basic set (e.g., a domain), and connects domains on a large scale.

SUMMARY

In one general aspect, there is provided a method of performing routing between domains for a Content-Centric Network (CCN), the method including identifying a route from an anchor hub in a first domain to one or more hubs in the first domain, the anchor hub being configured to store routing information between a first border hub of the hubs in the first domain and a second border hub in a second domain, detecting, by each of the hubs in the first domain, a neighboring hub based on a sync direction corresponding to the identified route, and sharing the routing information with the neighboring hub, the sharing of the routing information including performing a sync operation between the neighboring hub and each of the hubs in the first domain.

The general aspect of the method may further provide that each of the hubs in the first domain includes a first sync tree, a second sync tree, or a combination thereof, the first sync tree including first connection information on a connection between the first domain and the second domain, the second sync tree including second connection information on a connection between the anchor hub, the first border hub, and the hubs in the first domain.

The general aspect of the method may further provide that the identifying of the route is based on the first connection information and the second connection information.

The general aspect of the method may further provide that the second domain includes one or more hubs, each of the hubs of the second domain including the first sync tree, the second sync tree, or the combination thereof, and the hubs of the first domain and the hubs of the second domain are configured to generate a routing table for the first domain and the second domain, the routing table being configured to store the routing information being based on the first sync tree, the second sync tree, or the combination thereof.

The general aspect of the method may further provide updating the sync direction based on whether the routing information is exchangeable through the identified route.

The general aspect of the method may further provide connecting the first border hub and the second border hub through the sync operation, and disconnecting the first border hub and the second border hub based on results of a traffic relationship, a trust relationship, or a combination thereof established between the first domain and the second domain.

The general aspect of the method may further provide, when the first border hub and the second border hub are disconnected, deleting connection information in the first border hub, the second border hub, or a combination thereof on a connection between the first border hub and the second border hub.

The general aspect of the method may further provide that the anchor hub in the first hub stores history information associated with a connection between the first border hub and the second border hub.

The general aspect of the method may further provide reconnecting the first border hub and the second border hub based on the history information, and sharing routing information obtained by the reconnecting of the first border hub and the second border hub.

In another general aspect, there is provided a non-transitory computer readable recording medium storing a program to cause a computer to implement the method of performing routing between domains for the CCN.

In yet another general aspect, there is provided a hub included in a first domain of a Content-Centric Network (CCN), the hub including an identifying unit configured to identify a route to an anchor hub in the first domain, the anchor hub being configured to store routing information between a first border hub in the first domain and a second border hub in a second domain, a detecting unit configured to detect a neighboring hub based on a sync direction corresponding to the identified route, and a sharing unit configured to perform a sync operation with the neighboring hub to share the routing information with the neighboring hub.

The general aspect of the hub may further provide that the anchor hub in the first domain includes the first border hub in the first domain.

The general aspect of the hub may further provide a first sync tree including first connection information on a connection between the first domain and the second domain, a second sync tree including second connection information on a connection between the hub, the anchor hub, and the first border hub in the first domain, or a combination thereof.

The general aspect of the hub may further provide that the identifying unit is further configured to identify the route based on the first connection information and the second connection information.

The general aspect of the hub may further provide an updating unit configured to update the sync direction based on whether the routing information is exchangeable through the identified route.

The general aspect of the hub may further provide that the first border hub and the second border hub are connected through the sync operation, and the first border hub and the second border hub are disconnected based on results of a traffic relationship, a trust relationship, or a combination thereof established between the first domain and the second domain.

The general aspect of the hub may further provide that, when the first border hub and the second border hub are disconnected, the first border hub, the second border hub, or a combination thereof deletes connection information on a connection between the first border hub and the second border hub.

The general aspect of the hub may further provide that the anchor hub stores history information associated with a connection between the first border hub and the second border hub.

The general aspect of the hub may further provide that, when the first border hub and the second border are reconnected based on the history information, the sharing unit is further configured to share routing information obtained by reconnecting the first border hub and the second border hub.

In still another general aspect, there is provided a Content-Centric Network (CCN), including an anchor hub in a first domain, the anchor hub being configured to identify a route to one or more first hubs in a first domain, the anchor hub being further configured to share routing information with a neighboring hub based on a sync direction corresponding to the identified route, a border hub in the first domain connected to a hub in a second domain, the second domain being distinguished from the first domain, and one or more second hubs obtained by excluding the anchor hub and the border hub from the first domain and the second domain.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. In addition, description of well-known functions and constructions may be omitted for increased clarity and conciseness.

Figure 1:
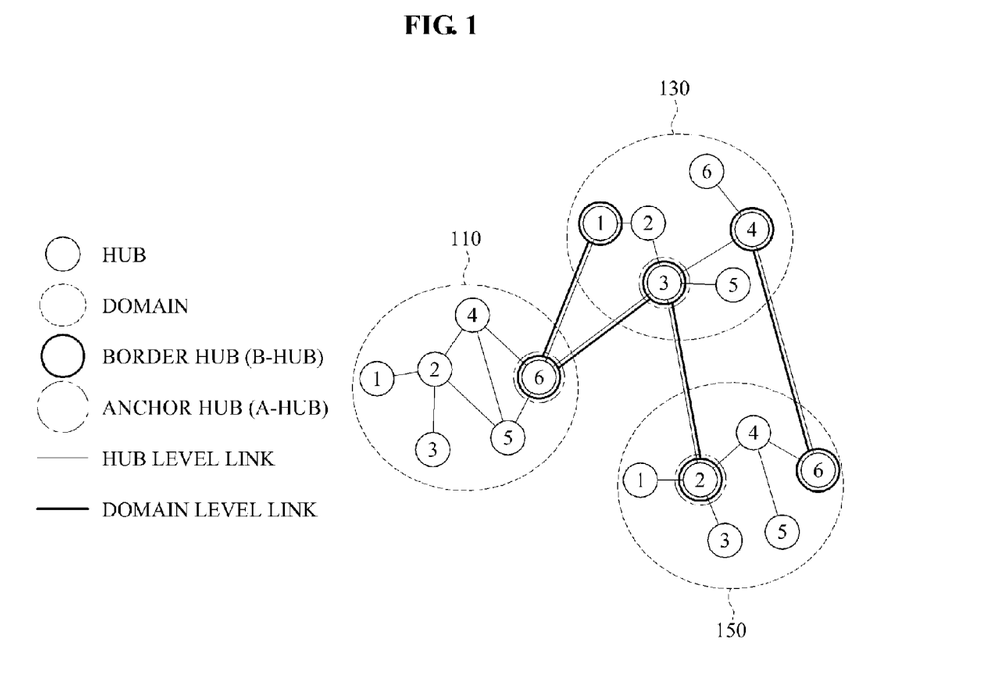
FIG. 1 is a diagram illustrating an example of a network topology representing connections between domains for a Content-Centric Network (CCN), and connections between hubs in each of the domains.

FIG. 1 is a diagram illustrating an example of a network topology representing connections between domains for a Content-Centric Network (CCN), and connections between hubs in each of the domains.

Referring to FIG. 1, the CCN includes one or more domains. For example, the CCN of FIG. 1 includes a first domain 110, a second domain 130, and a third domain 150. Each of the domains includes one or more hubs. The first domain 110 is connected by hub level links and domain level links to the second domain 130. The second domain 130 is connected by hub level links and domain level links to the third domain 150. The first domain 110 is connected to the third domain 150 by way of connections to the second domain 130. As a result, the first domain 110, the second domain 130, and the third domain 150 form a single group of connected domains. Additionally, certain hubs respectively included in the first domain 110, the second domain 130, and the third domain 150 may be classified as a border hub or an anchor hub based on a predetermined reference.

Each of the first domain 110, the second domain 130, and the third domain 150 includes a set of hubs. The first domain 110, the second domain 130, and the third domain 150 may include user devices having similar purposes. The user device may include, for example, a communication terminal, such as a notebook computer, a smartphone, or the like, an MPEG layer-3 (MP3) player, a sensor, or the like. In a social network, a set of users having a certain purpose, such as, for example, a home, an office, a community, or the like, may correspond to a domain. A Virtual Personal Community (VPC) in the social network may correspond to a domain. Additionally, in a physical network, a predetermined area for each Internet Service Provider (ISP) may correspond to a domain.

The hubs are social hubs that aggregate predetermined user devices and connect the aggregated user devices. In the following example, all user devices are assumed to be connected to a network via one or more hubs. A hub may correspond to a router in a physical network.

Groups include a set of domains connected to each other. For example, when traffic information is exchanged between domains, the domains are connected and may exchange routing information with each other through a sync operation. In this example, the domains exchanging the routing information with each other may be considered to have a relationship with each other. Domains having no relationship are disconnected from each other, and do not exchange routing information any longer.

A sync tree is a tree-shaped data structure in a hub. Each hub maintains routing information in the sync tree. Sync trees will be described later with reference to FIGS. 5 and 6. A sync operation includes an exchanging of sync trees between two connected hubs or an exchanging of information stored in the sync trees of two connected hubs. When the sync operation is performed, the two connected hubs may share all information stored in their respective sync trees, either by way of an exchange of sync trees or an exchanging of information stored in sync trees. As a result, the two connected hubs may contain the same routing information or the same sync tree. Thus, the sync operation enables information stored in the respective sync trees of two connected hubs to coincide with each other.

A connection of hubs is a logical session in which routing information is exchanged by performing the sync operation. For example, when hubs are disconnected from each other, the hubs do not exchange routing information with each other. Similarly, when domains are disconnected from each other, the domains do not exchange routing information with each other.

The hubs and domains respectively include physical links or logical links between each other. Domains or hubs are respectively connected to each other through these links. In FIG. 1, both hub level links, referring to a physical link or logical link between hubs, and domain level links, referring to a physical link or logical link between domains, are illustrated.

Border hubs are connected to a hub included in another domain. The border hub may perform a sync operation with a neighboring hub and, accordingly, may share information stored in an anchor hub with the neighboring hub.

There is one anchor hub in each domain. The anchor hub is connected to all border hubs included in a domain to which the anchor hub belongs. The anchor hub may exchange routing information with a neighboring hub based on a sync direction corresponding to an identified route to each of the hubs included in the domain to which the anchor hub belongs. Additionally, the anchor hub may store history information associated with connection between all the border hubs included in the domain to which the anchor hub belongs. The anchor hub may be one of the border hubs. The anchor hub may identify a route to each of the hubs in the domain.

Referring to FIG. 1, a hub 6 in the first domain 110, a hub 3 in the second domain 130, and a hub 2 in the third domain 150 are anchor hubs. In the first domain 110, the hub 6 is used as an anchor hub and a border hub. Additionally, in the second domain 130, the hub 3 is used as an anchor hub and a border hub, and hubs 1 and 4 are used as border hubs. Furthermore, in the third domain 150, the hub 2 is used as an anchor hub and a border hub, and a hub 6 is used as a border hub.

Figure 2:
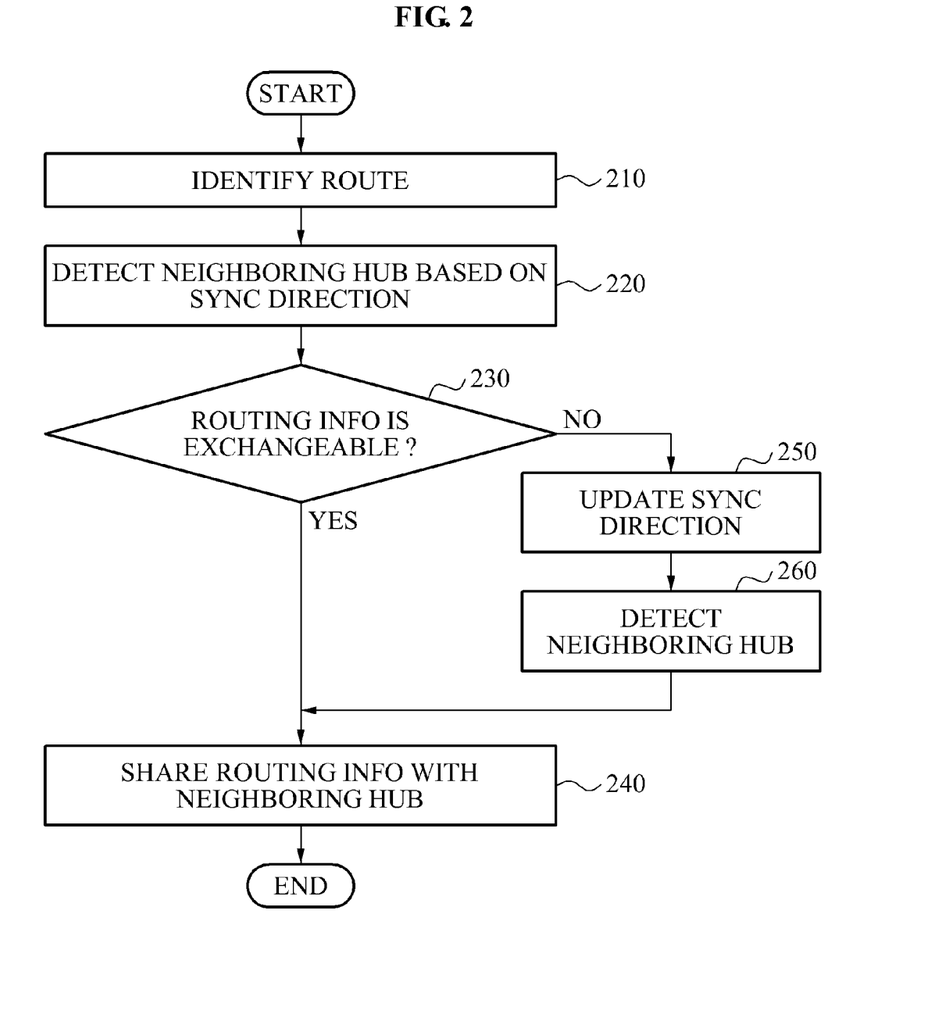
FIG. 2 is a flowchart illustrating an example of a method of performing routing between domains for a CCN.

FIG. 2 is a flowchart illustrating an example of a method of performing routing between domains for a CCN. Referring to FIG. 2, when routes from an anchor hub in a first domain to each of the hubs in the first domain are identified (210), each of the hubs in the first domain detects (220) a neighboring hub based on a sync direction corresponding to the identified route. The neighboring hub is used to perform a sync operation with each of the hubs. The anchor hub in the first domain stores routing information between a first border hub in the first domain and a second border hub in a second domain.

Each of the hubs in the first domain may include a first sync tree, a second sync tree, or a combination thereof. The first sync tree includes connection information on connections between the first domain and the second domain. The second sync tree includes connection information on connections between the anchor hub, the first border hub, and the hubs in the first domain. The first sync tree and the second sync tree will be respectively described later with reference to FIGS. 5 and 6.

The route may be identified based on information stored in each of the first sync tree and the second sync tree. Based on the first sync tree and the second sync tree, the hubs in the first domain and one or more hubs in the second domain may generate a routing table for the first domain and the second domain. Additionally, a user device connected to each of the hubs in the first domain and the second domain may generate an entry of a Forwarding Information Base (FIB) for the CCN, based on the routing table.

Each of the hubs in the first domain determines (230) whether the routing information is exchangeable through the identified route. In an example in which the routing information is determined to be exchangeable, each of the hubs in the first domain shares (240) the routing information with the neighboring hub by performing the sync operation with the neighboring hub. In this example, the sync operation may be performed hop-by-hop.

Figure 5:
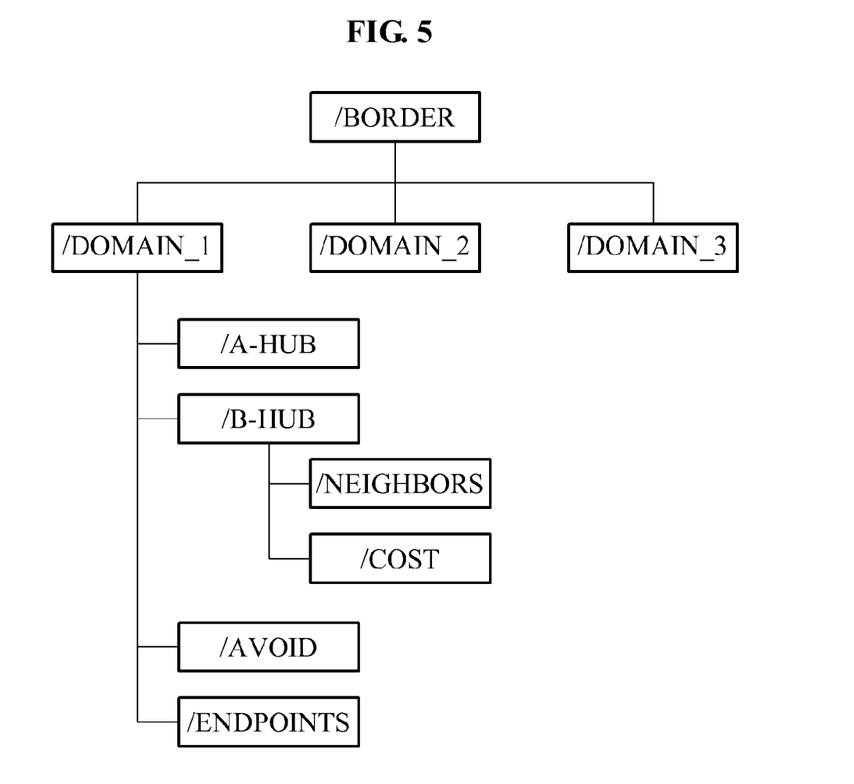
FIG. 5 is a diagram illustrating an example of a first sync tree including information on connections between domains for a CCN.
Figure 6:
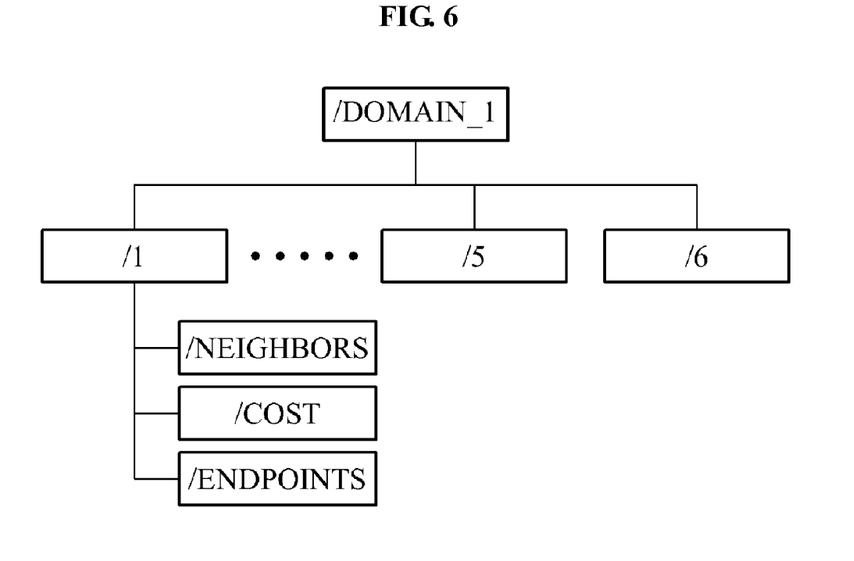
FIG. 6 is a diagram illustrating an example of a second sync tree including information on connections between hubs included in each domain for a CCN.

For example, two border hubs connected to each other may maintain sync trees configured as illustrated in FIGS. 5 and 6. Information in the sync trees of the two hubs may be identical to each other through the sharing of routing information. For example, when information stored in a sync tree of a border hub in one of two domains is changed, or when information stored in a sync tree of respective border hubs in the two domains is changed, each of the border hubs may transfer the changed information to another border hub, so that all the border hubs have the same sync tree.

In another example, when the routing information is determined to be nonexchangeable, each of the hubs in the first domain updates (250) the sync direction. The example in which the routing information is determined to be nonexchangeble indicates difficulty in performing the sync operation in the sync direction corresponding to the identified route due to a link failure or the like. Additionally, each of the hubs in the first domain may again generate or calculate a routing table and update the sync direction to a next-hop hub in a route having the shortest distance to the anchor hub.

After each of the hubs in the first domain updates the sync direction in view of the determination that the routing information is nonexchangable, each of the hubs in the first domain detects (260) another neighboring hub based on the updated sync direction and share the routing information with the detected neighboring hub. The detected neighboring hub may also be used to perform the sync operation.

Figure 3:
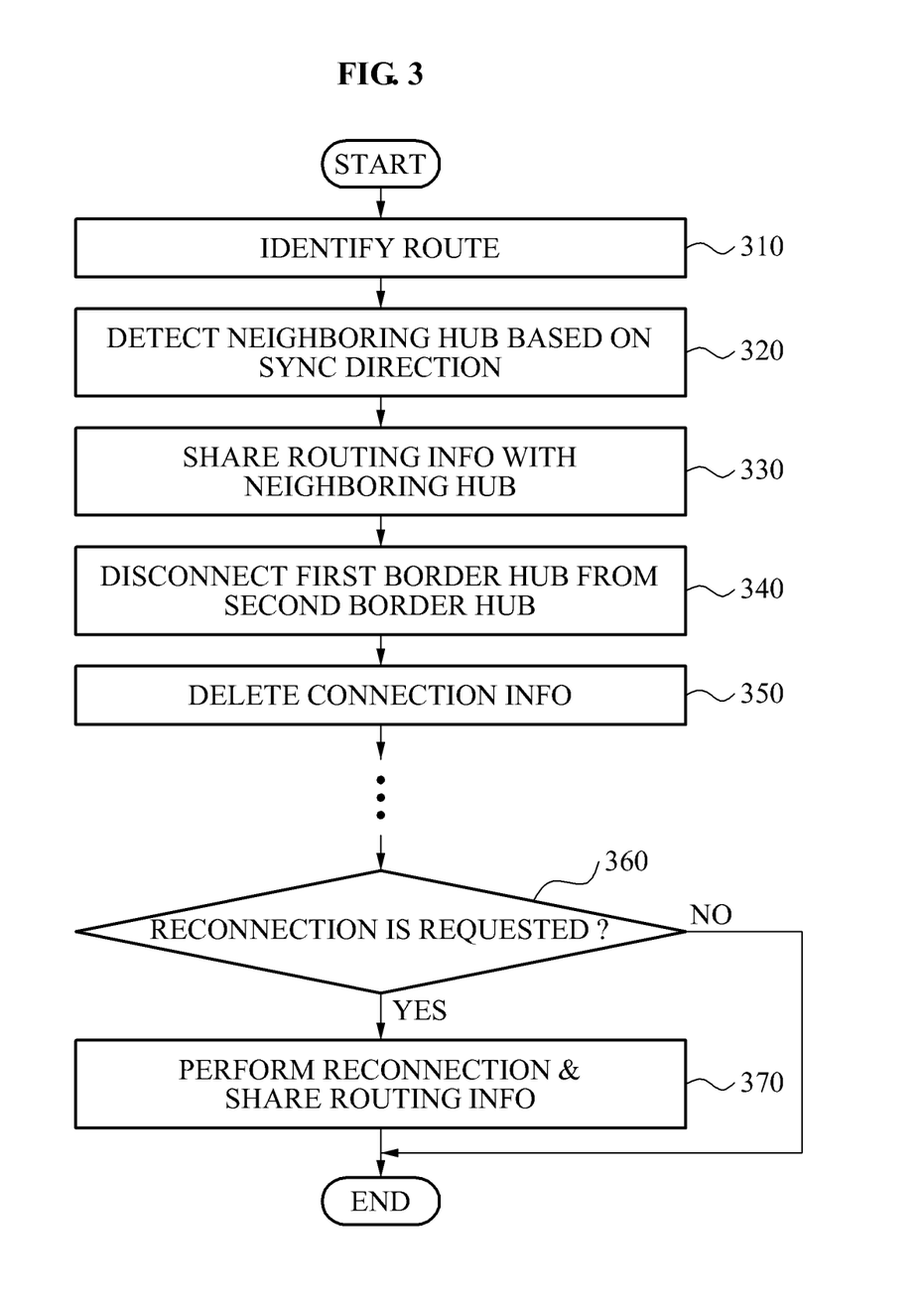
FIG. 3 is a flowchart illustrating another example of a method of performing routing between domains for a CCN.

FIG. 3 is a flowchart illustrating another example of a method of performing routing between domains for a CCN. Referring to FIG. 3, when a route from an anchor hub in a first domain to each of the hubs in the first domain is identified (310), each of the hubs in the first domain detects (320) a neighboring hub based on a sync direction corresponding to the identified route. The neighboring hub may be used to perform a sync operation with each of the hubs. A scheme of determining the sync direction will be described with reference to FIG. 4.

The anchor hub in the first domain may store routing information between a first border hub in the first domain and a second border hub in a second domain. Additionally, each of the hubs in the first domain includes a first sync tree, a second sync tree, or a combination thereof. The first sync tree and the second sync tree have been already described above, and will be further described later with reference to FIGS. 5 and 6. The route may be identified based on the first sync tree and the second sync tree.

Each of the hubs in the first domain shares (330) the routing information with the neighboring hub by performing the sync operation with the neighboring hub. The sync operation connects the first border hub to the second border hub. The first border hub in the first domain is disconnected (340) from the second border hub based on a traffic and trust relationship between the first domain and the second domain.

For example, border hubs may monitor traffic between domains. When the traffic between domains is less than predetermined reference traffic, or when a trust relationship between connected domains is determined to be violated, border hubs in one of the connected domains disconnect from border hubs in the other domain. Additionally, one of the two disconnected border hubs does not notify the other border hub of changes in information stored in a sync tree of the border hub.

When two domains are completely disconnected, or, as an example, when all sync operations between the second domain 130 and the third domain 150 of FIG. 1 are interrupted, only the first domain 110 and the second domain 130 are included in the same group. The third domain 150 may be included in a group other than the group in which the first domain 110 and the second domain 130 are included. In this example, the third domain 150 may re-generate a routing table, and may maintain only an entry for a destination in the group including the third domain 150.

Additionally, in a FIB for the CCN, all entries of the group including the first domain 110 and the second domain 130 are deleted. However, instead of exchanging a change in routing information stored in a sync tree, the disconnected border hubs may periodically exchange a "keepalive" message. Accordingly, the disconnected border hubs may continue to monitor a state of a link by exchanging the "keepalive" message.

When the first border hub is disconnected from the second border hub, or vice versa, the first border hub, the second border hub, or a combination thereof deletes (350) connection information on connection between the first border hub and the second border hub. Additionally, the anchor hub in the first domain may store history information associated with the connection between the first border hub and the second border hub, even when the connection information is deleted.

The first border hub or the second border hub may determine (360) whether reconnection between the first border hub and the second border hub is requested. For example, when reconnection is determined to be requested, the first border hub is reconnected to the second border hub based on the history information stored in the anchor hub in the first domain.

Routing information is shared (370) between the reconnected first and second border hubs. The first border hub and the second border hub may be reconnected to each other depending on whether each of the first domain and the second domain forms a social network or a physical network. For example, when domains form a social network, the social network may be configured in the form of an overlay with another networking protocol, such as an Internet Protocol (IP).

In the physical network, an anchor hub and border hubs may be used as routers in a CCN, and a link between the anchor hub and border hubs may be a physical link. It is assumed that the physical link is connected and set manually by a manager, and, thus, is not changed frequently.

Hereinafter, reconnection between the first border hub and the second border hub in the social network will be described. The anchor hub in the first domain may order the first border hub in the first domain to perform reconnection with the second border hub in the second domain using the history information stored in the anchor hub. In an example, when the reconnection succeeds, the first border hub may perform, hop-by-hop, a sync operation with the second border hub. When the sync operation is completed, the first border hub may perform a sync operation with the anchor hub.

In another example, when the reconnection fails, the anchor hub in the first domain acquires a Session Initiation Protocol (SIP) address from an anchor hub in the second domain, and may be connected to the anchor hub in the second domain. In this example, names of the anchor hubs may be respectively generated to be '/first domain/first anchor hub' and '/second domain/second anchor hub'. Subsequently, border hubs in each of the first domain and the second domain perform sync operations hop-by-hop, through connection between the anchor hubs.

Hereinafter, reconnection between the first border hub and the second border hub in the physical network will be described. The anchor hub in the first domain orders the first border hub in the first domain to perform reconnection, using the history information stored in the anchor hub. When the reconnection fails, the first border hub notifies a manager of the failure of the reconnection attempt.

In general, a physical link is not changed frequently. Even when the physical link is changed, a new border hub may be set by a manager at all times. Additionally, failures in hardware may be analyzed in real time through exchanging of "keepalive" messages or the like, and may be reported to the manager. Accordingly, in the physical network, the reconnection may not actually fail.

Figure 4:
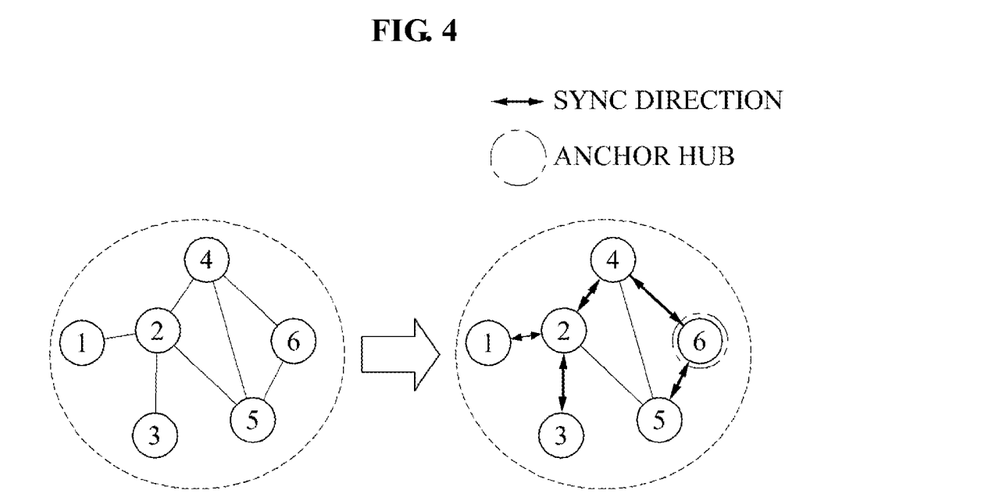
FIG. 4 is a diagram illustrating an example of a sync direction determined in a domain for a CCN.

FIG. 4 is a diagram illustrating an example of a sync direction determined in a domain for a CCN.

All hubs have a sync tree associated with information between domains and/or a sync tree associated with information in domains, as respectively illustrated in FIGS. 5 and 6, and stores routing information in the two sync trees. According to embodiments, only a single anchor hub is included in a single domain, and all hubs calculate a shortest routing route between an anchor hub and each of the hubs. A sync direction is determined to be a direction of a route identified based on the shortest routing route.

For example, a predetermined hub compares a sync tree of the predetermined hub with a sync tree of a neighboring hub connected to the predetermined hub in a sync direction. Because of the comparing, when the sync trees are partially different from each other, the predetermined hub may update the sync tree of the predetermined hub with the latest information from the sync tree of the neighboring hub. Accordingly, all connected hubs in a domain may share the same sync tree information with each other.

In a topology of a left domain illustrated in FIG. 4, a hub 6 is assumed to be an anchor hub. Each of the other hubs 1 to 5 in the left domain computes a shortest routing route from the hub 6 to each of the hubs 1 to 5, and identifies the computed shortest routing route. In this example, a route from the hub 1 to the hub 2, a route from the hub 2 to the hub 3, a route from the hub 2 to the hub 4, a route from the hub 4 to the hub 6, and a route from the hub 6 to the hub 5 are computed as the shortest routing routes, and, accordingly, the computed shortest routing routes are be identified. As illustrated in a right domain of FIG. 4, sync directions may be determined to be directions corresponding to the identified routes.

For example, when a sync direction is determined as described above, and when 'n' hubs exists, a sync operation may be performed through 'n−1' links at all times. Accordingly, '$O(n^2)$' messages generated when a sync direction is not designated may be reduced to '$O(n)$'.

FIG. 5 is a diagram illustrating an example of a first sync tree including information on connections between domains for a CCN. The information may be contained in each of the hubs included in each of the domains. The information is included in all border hubs in each of the domains, and may include, for example, /A-hub, /B-hub, /Neighbors, /Avoid, and the like.

In the first sync tree, /A-hub indicates an anchor hub included in a corresponding domain, and /B-hub indicates a list of border hubs included in the corresponding domain. Additionally, /Neighbors indicates a list of domains connected directly to a corresponding domain, and /Cost indicates a cost for a link configured to connect a border hub of a corresponding domain to a border hub of a domain connected to the corresponding domain. Furthermore, in the first sync tree, /Avoid indicates a list of domains that need to be excluded from a routing route, and /Endpoints indicates information on an interface of each border hub. The domains that need to be excluded from the routing route may not desire to perform a sync operation due to a policy reason or the like. For example, since the domains may not need to maintain a trust relationship, or may determine not to share information with each other, there is no need to perform the sync operation.

FIG. 6 is a diagram illustrating an example of a second sync tree including information on connections between hubs included in each domain for a CCN. The information is included in each of the hubs, and includes, for example, /Neighbors, /Cost, /Endpoints, and the like.

In the second sync tree, /Neighbors indicates a list of hubs connected directly to a corresponding hub, and /Cost indicates a cost for a link configured to connect a corresponding hub to another hub in a domain. Additionally, /Endpoints indicates information on an interface of each of the hubs.

Figure 7:
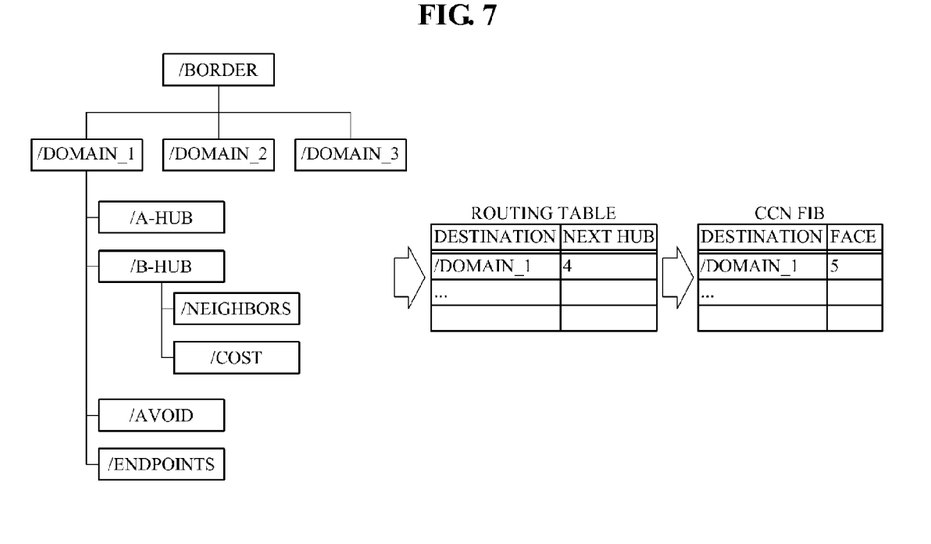
FIG. 7 is a diagram illustrating an example of a relationship among a sync tree, a routing table, and a Forwarding Information Base (FIB) in each of the hubs included in each of the domains for a CCN.

FIG. 7 is a diagram illustrating an example of a relationship among a sync tree, a routing table, and an FIB in each of the hubs included in each of domains for a CCN. For example, a routing table for a first domain is generated based on a first sync tree including /neighbor, /cost, /Avoid, and the like. Additionally, user devices included in the first domain generate an FIB for the CCN based on the routing table. The user devices in the first domain add an entry of the FIB by looking up the routing table. In this example, a difference between the routing table and the FIB is determined based on whether to notify a next hub to be connected, or to notify a face number with respect to a destination.

Figure 8:
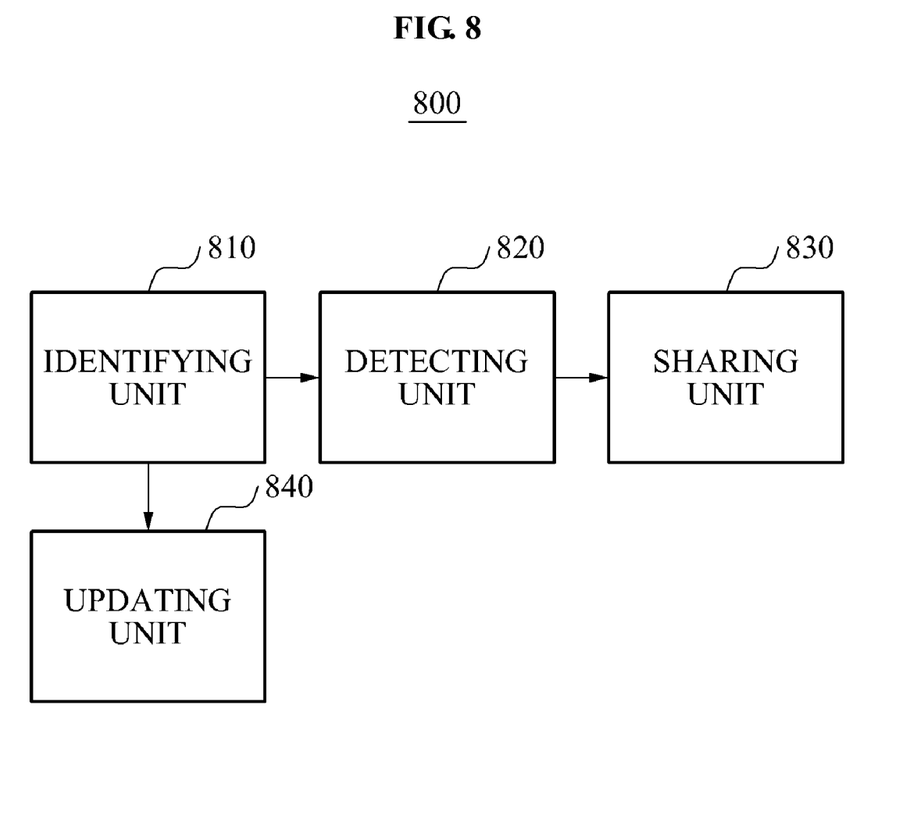
FIG. 8 is a block diagram illustrating an example of a hub included in a domain of a CCN.

FIG. 8 is a block diagram illustrating an example of a hub included in a domain for a CCN. Referring to FIG. 8, a hub 800 includes an identifying unit 810, a detecting unit 820, a sharing unit 830, and an updating unit 840. As an example, the hub 800 is included in a first domain. The identifying unit 810 identifies a route from an anchor hub in the first domain to the hub 800. The anchor hub stores routing information between a first border hub in the first domain and a second border hub in a second domain. The identifying unit 810 identifies the route based on a first sync tree and a second sync tree. The hub 800 includes the first sync tree, the second sync tree, or a combination thereof. The first sync tree includes connection information on connection between the first domain and the second domain. The second sync tree includes connection information on connection between the hub 800, the anchor hub, and the first border hub that are included in the first domain.

The detecting unit 820 detects a neighboring hub based on a sync direction corresponding to the identified route. The neighboring hub is used to perform a sync operation with the hub 800. The sharing unit 830 shares the routing information with the neighboring hub by performing the sync operation between the neighboring hub and the hub 800. The updating unit 840 updates the sync direction based on whether the routing information is exchangeable through the identified route.

The first border hub and the second border hub that are connected through the sync operation may be disconnected based on traffic and trust relationships between the first domain and the second domain. Additionally, when the first border hub and the second border hub are disconnected, the first border hub, the second border hub, or a combination thereof deletes connection information on connection between the first border hub and the second border hub. The anchor hub stores history information associated with the connection between the first border hub and the second border hub. Accordingly, the sharing unit 830 shares routing information obtained by reconnecting the first border hub and the second border hub based on the history information.

According to teachings above, there is provided a method of performing routing between domains for a CCN, in which a group is formed based on a relationship between domains, and control traffic for routing and an entry of a routing table is limited within the group, which may serve to increase a size of the routing table linearly to an increase in a number of domains within a group.

According to teachings above, there is provided a method of performing routing between domains for a CCN, in which domains having no relationship are disconnected and a border hub in a domain disconnected from a border hub in another domain deletes connection information on connection between the border hubs, which may serve to reduce a size of a routing table.

According to teachings above, there is provided a method of performing routing between domains for a CCN, in which a border hub in one of two domains that are disconnected from each other maintains an independent routing table of the other domain, which may serve to prevent the routing table from being frequently updated.

According to teachings above, there is provided a method of performing routing between domains for a CCN, in which an anchor hub in first domain stores information on connection between all border hubs in a second domain that has been disconnected from the first domain, which may serve to enable the reconnection of the first and second domains even when the domains are disconnected from each other and the border hubs of the respective domains delete connection information with respect to the other domain as a result of the disconnection.

The units described herein may be implemented using hardware components and software components, such as, for example, microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. In addition, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a hub in a first domain of a Content-Centric Network (CCN), the method comprising:
    identifying a route from the hub to an anchor hub in the first domain, the anchor hub being configured to store routing information between a first border hub of the hubs in the first domain and a second border hub in a second domain;
    detecting a neighboring hub based on a sync direction of the identified route; and
    sharing the routing information with the neighboring hub, the sharing of the routing information comprising performing a sync operation with the neighboring hub,
    wherein the hub is configured to generate a routing table for the first domain based on information of avoided domains, and wherein the avoided domains indicate domains that are excluded from a routing route and the avoided domains are defined based on a trust relationship.

2. The method of claim 1, wherein each of the hubs in the first domain comprises a first sync tree, a second sync tree, or a combination thereof, the first sync tree comprising first connection information on a connection between the first domain and the second domain, the second sync tree comprising second connection information on a connection between the anchor hub, the first border hub, and the hubs in the first domain.

3. The method of claim 2, wherein the identifying of the route is based on the first connection information and the second connection information.

4. The method of claim 2, wherein:
    the second domain comprises one or more hubs, each of the hubs of the second domain comprising the first sync tree, the second sync tree, or the combination thereof; and
    the hubs of the first domain and the hubs of the second domain are configured to generate a routing table of the first domain and the second domain, the routing table being configured to store the routing information being based on the first sync tree, the second sync tree, or the combination thereof.

5. The method of claim 1, further comprising:
    updating the sync direction based on whether the routing information is exchangeable through the identified route.

6. The method of claim 1, further comprising:
connecting the first border hub and the second border hub through the sync operation; and
disconnecting the first border hub and the second border hub based on results of a traffic relationship, a trust relationship, or a combination thereof established between the first domain and the second domain.

7. The method of claim 6, further comprising:
deleting connection information in the first border hub, the second border hub, or a combination thereof on a connection between the first border hub and the second border hub in response to the first border hub and the second border hub being disconnected.

8. The method of claim 6, wherein the anchor hub in the first hub is configured to store history information of a connection between the first border hub and the second border hub.

9. The method of claim 8, further comprising:
reconnecting the first border hub and the second border hub based on the history information; and
sharing routing information obtained by the reconnecting of the first border hub and the second border hub.

10. A non-transitory computer readable recording medium storing a program to cause a computer to implement the method of claim 1.

11. A hub included in a first domain of a Content-Centric Network (CCN), the hub comprising:
a hardware processor configured to
identify a route from the hub to an anchor hub in the first domain, the anchor hub being configured to store routing information between a first border hub of the hubs in the first domain and a second border hub in a second domain,
detect a neighboring hub based on a sync direction of the identified route; and
perform a sync operation with the neighboring hub to share the routing information with the neighboring hub, wherein
the hub is configured to generate a routing table for the first domain based on information of avoided domains, and wherein the avoided domains indicate domains that are excluded from a routing route and the avoided domains are defined based on a trust relationship.

12. The hub of claim 11, wherein the anchor hub in the first domain comprises the first border hub in the first domain.

13. The hub of claim 11, further comprising:
a first sync tree comprising first connection information of a connection between the first domain and the second domain;
a second sync tree comprising second connection information or a connection between the hub, the anchor hub, and the first border hub in the first domain; or
a combination thereof.

14. The hub of claim 13, wherein the hardware processor is further configured to identify the route based on the first connection information and the second connection information.

15. The hub of claim 13, wherein the first sync tree comprises a list of domains excluded from the identified route.

16. The hub of claim 13, wherein the first border hub is configured to match the first sync tree and the second sync tree with the first sync tree and the second sync tree of the second border hub in response to the sync operation being performed.

17. The hub of claim 13, further configured to generate second routing information and update the sync direction to a next-hop hub in a route having the shortest distance to the anchor hub in response to the routing information being determined to be nonexchangeable.

18. The hub of claim 11, wherein the hardware processor is configured to update the sync direction based on whether the routing information is exchangeable through the identified route.

19. The hub of claim 11, wherein:
the first border hub and the second border hub are configured to be connected through the sync operation; and
wherein the first border hub and the second border hub are configured to be disconnected based on results of a traffic relationship, a trust relationship, or a combination thereof established between the first domain and the second domain.

20. The hub of claim 19, wherein the first border hub, the second border hub, or a combination thereof is configured to delete connection information on a connection between the first border hub and the second border hub in response to the first border hub and the second border hub being disconnected.

21. The hub of claim 19, wherein the anchor hub is configured to store history information associated with a connection between the first border hub and the second border hub.

22. The hub of claim 21, wherein the hardware processor is further configured to share routing information obtained by reconnecting the first border hub and the second border hub in response to the first border hub and the second border hub being reconnected based on the history information.

23. The hub of claim 22, wherein the anchor hub in the first domain is configured to connect with an anchor hub in the second domain in response to the reconnection between the first border hub and the second border hub failing.

24. The hub of claim 22, wherein the anchor hub in the first domain acquires a Session Initiation Protocol address from an anchor hub in a neighboring domain, names of the anchor hubs are generated to correlate the first domain to the first anchor hub and the second domain to the second anchor hub, and the first border hub and the second border hub is configured to perform a sync operation in response to the anchor hub in the first domain acquiring a Session Initiation Protocol address.

25. A Content-Centric Network (CCN), comprising:
an anchor hub in a first domain, the anchor hub being configured to:
identify a route to one or more first hubs in a first domain;
detect a neighboring hub based on a sync direction of the identified route; and
share routing information with a neighboring hub based on the sync direction of the identified route;
a border hub in the first domain connected to a hub in a second domain, the second domain being distinguished from the first domain; and
one or more second hubs obtained by excluding the anchor hub and the border hub from the first domain and the second domain, wherein
the first hubs in the first domain are configured to generate a routing table of the first domain based on information of avoided domains, and wherein the avoided domains indicate domains that are excluded from a routing route and the avoided domains are defined based on a trust relationship.

26. The CCN of claim 25, wherein the border hub is configured to delete connection information between the border hub in the first domain and the border hub of a domain connected to the first domain and reduce a size of the routing table In response to the first border hub being disconnected from the border hub of a domain connected to the first domain, and wherein
    the border hub of the first domain is independent of the border hub of the domain connected to the first domain.

27. The CCN of claim 25, wherein the first border hub and the border hub of the domain connected to the first domain are configured to be reconnected based on whether the first domain and the domain connected to the first domain form a social network or a physical network, in response to the first border hub and the border hub of the domain connected to the first domain being disconnected.

28. The CCN of claim 25, wherein the routing table is used to generate a Forwarding Information Base (FIB), and a difference between the routing table and the FIB is determined based on whether to notify a next hub to be connected.

* * * * *